(12) United States Patent
Borgen et al.

(10) Patent No.: US 6,659,249 B2
(45) Date of Patent: Dec. 9, 2003

(54) DUAL DISCONNECT DRIVE ASSEMBLY

(75) Inventors: Wayne Lee Borgen, Fort Wayne, IN (US); William Gordon Hunt, Roanoke, IN (US); Ernest Campbell, Columbia City, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/084,487

(22) Filed: Feb. 28, 2002

(65) Prior Publication Data

US 2003/0047403 A1 Mar. 13, 2003

Related U.S. Application Data

(63) Continuation-in-part of application No. 09/950,574, filed on Sep. 13, 2001, now abandoned.

(51) Int. Cl.⁷ .......................... F16D 11/14; F16D 21/02; B60K 23/08
(52) U.S. Cl. ...................... 192/50; 192/69.91; 475/222; 180/247
(58) Field of Search ................. 192/48.7, 48.8, 192/49, 50, 69.9, 69.91; 475/222, 231; 180/247, 250

(56) References Cited

U.S. PATENT DOCUMENTS

| | | |
|---|---|---|
| 1,243,720 A | 10/1917 | Eidson et al. |
| 1,506,915 A | 9/1924 | Minthorn |
| 1,631,837 A | 6/1927 | Stone |
| 2,620,055 A * | 12/1952 | Fasulo ........................ 192/50 X |
| 2,913,929 A * | 11/1959 | Anderson ............... 475/222 X |
| 3,050,321 A | 8/1962 | Howe et al. |
| 3,262,512 A | 7/1966 | O'Brien |
| 3,498,154 A | 3/1970 | Muller-Berner |
| 3,960,253 A | 6/1976 | Sigg |
| 3,973,450 A | 8/1976 | Shealy |
| 4,086,991 A | 5/1978 | Swadley |
| 4,167,881 A | 9/1979 | Bell et al. |
| 4,271,722 A | 6/1981 | Campbell |
| 4,282,949 A | 8/1981 | Kopich et al. |
| 4,304,317 A | 12/1981 | Vanzant et al. |
| 4,341,281 A | 7/1982 | Nagy |
| 4,482,039 A | 11/1984 | Harris |
| 4,625,584 A | 12/1986 | Onodera |
| 4,779,698 A | 10/1988 | Iwata |
| 4,915,190 A | 4/1990 | Iwata |
| 4,981,192 A | 1/1991 | Kurihara et al. |
| 5,171,192 A | 12/1992 | Schlosser et al. |
| 5,267,915 A | 12/1993 | Estabrook |
| 5,586,632 A | 12/1996 | Bigley et al. |
| 5,692,590 A | 12/1997 | Iihara et al. |
| 5,908,080 A | 6/1999 | Bigley et al. |
| 5,996,720 A | 12/1999 | Hunt |
| 6,517,462 B2 * | 2/2003 | Borgan et al. ............... 475/220 |
| 2003/0019672 A1 * | 1/2003 | Borgen et al. ............. 180/24.1 |

* cited by examiner

Primary Examiner—Richard M. Lorence
(74) Attorney, Agent, or Firm—Liniak, Berenato & White

(57) ABSTRACT

A dual disconnect differential assembly for four-wheel drive (4WD) vehicle is disclosed. This disconnect differential assembly connects/disconnects both output shafts of a differential assembly simultaneously from the respective universal joints of the drive assembly. Both output shafts are interconnected to provide simultaneous sliding along an axial direction. A clutch mechanism associated with the inboard side of each universal joint (which may be a constant velocity joint) and with the output shafts is provided for simultaneous connection and simultaneous disconnection of the output shafts from the outboard side of the universal joint. The dual disconnect differential assembly herein is simple, compact, and reliable. It overcomes the disadvantages associated with single axle disconnect mechanisms presently in use. It also provides a simpler, more compact, and more reliable dual disconnect differential mechanism than any such mechanism presently known.

20 Claims, 4 Drawing Sheets

US 6,659,249 B2

DUAL DISCONNECT DRIVE ASSEMBLY

This application is a Continuation-in-part of application Ser. No. 09/950,574 filed on Sep. 13, 2001 now abandoned.

BACKGROUND OF THE INVENTION

1. Field of the Invention

This invention relates to differential disconnect drive assemblies or mechanisms, and in particular to dual disconnect drive assemblies, for four-wheel drive vehicles which can be operated in either a two-wheel drive mode or a four-wheel drive mode.

2. Description of Related Art

Four-wheel drive vehicles, which are operable in either a two-wheel drive mode or a four-wheel drive mode, have gained widespread popularity. Axle disconnect mechanisms, or differential disconnect mechanisms or assemblies for such vehicles are known.

Commonly used disconnect mechanisms for four-wheel drive vehicles disconnect only one of the two output shafts on an axle assembly which is driven part time. This causes the pinion gears and the side gears of the differential to rotate due to back driving, although the differential case remains stationary. This is not compatible with speed-sensitive limited slip differentials. Also, single axle disconnect mechanisms may cause noise and wear and poor fuel economy due to rotation of the differential components while the vehicle is in two-wheel drive mode.

Various dual disconnect differential assemblies or mechanisms have been proposed. These mechanisms in general have an unnecessary number of moving parts, are fairly complex, and would be suitable only for installation on relatively wide vehicles because of the space required. Earlier designs have interposed a clutch member between the side gear and the output shaft. None has achieved desirable commercial acceptance.

SUMMARY OF THE INVENTION

This invention comprises a differential having first and second side gears, which are rotatable about a common transverse axis. Rotatable first and second output shafts are co-axial with the side gears and are arranged to drive a pair of respective wheels, and a universal joint (e.g., a constant velocity joint) is disposed between each output shaft and a respective wheel end. In accordance with this invention, a clutch mechanism is used for placing each output shaft simultaneously into or simultaneously out of driving engagement with the inboard side of an associated universal joint. An actuator is used to slidably and concurrently move the output shafts between the clutch engaging position and the clutch disengaging position with respect to the universal joint to thereby disconnect the output shaft from the associated axle shafts and joint assembly.

In the preferred embodiment, the output shafts have clutch members for engaging the clutch members of the respective first and second universal joints, with the output shafts being simultaneously slidable in a first direction to a clutch engaging position and simultaneously slidable in a second direction to a clutch disengaging position. The output shafts are interconnected to provide simultaneous sliding movement.

A preferred dual disconnect differential assembly according to the invention includes, as axially engageable clutch members, a spline interface connection between the first and second universal joints and the respective first and second output shafts. A biasing means is provided for biasing the output shafts to a clutch disengaging position. The vehicle is in two-wheel drive mode when the clutch is disengaged and in four-wheel drive mode when the clutch is engaged. An actuator causes sliding movement of the interconnected output shafts to translate the shafts into the disengaged position.

Another aspect of the clutch mechanism of the invention provides a pair of split-spline teeth on both the output shafts and the respective universal joints to reduce the travel distance required to engage/disengage the dual axle disconnect system.

The differential assembly of the present invention possesses several advantages, including greater fuel economy, less wear, and less noise compared to previously known disconnect mechanism in which only a single output shaft and its axle shaft are disengaged from driving engagement with a differential when two-wheel drive mode is selected. Advantages of the present invention compared to previously known dual disconnect differential assemblies include a more robust design without increased packaged size, fewer parts and greater compactness, which makes it possible to utilize the present dual disconnect drive mechanism on any size vehicle, including a sub-compact automobile. This makes it possible to offer four-wheel drive on smaller vehicles, including sub-compact automobiles, which have not previously had optional four-wheel drive because of the space requirements of presently known dual disconnect mechanism.

DESCRIPTION OF THE PREFERRED EMBODIMENTS

This invention will now be described in detail with reference to the best mode and preferred embodiments thereof.

Figure 1:
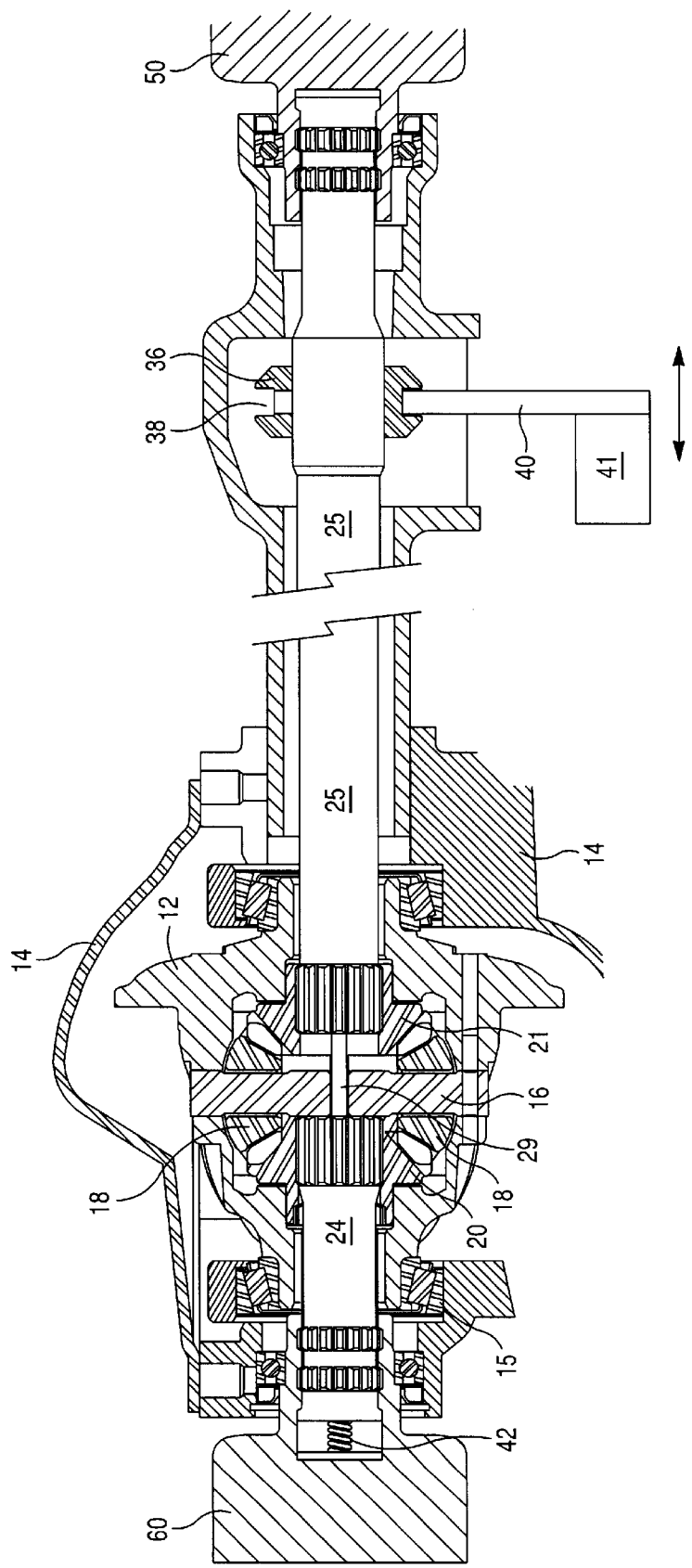
FIG. 1 is a sectional plan view of the invention according to a preferred embodiment of the invention.

Referring now to FIG. 1, a dual disconnect differential assembly (or mechanism) according to this invention is shown for a front axle of a four-wheel drive (4WD) vehicle having a fall-time rear axle and a part-time front axle.

The differential assembly in general is driven by a longitudinally extending pinion shaft (or input shaft) not shown, which in turn may be driven by a drive shaft (not shown) which extends longitudinally from a vehicle transmission. The pinion shaft may engage a ring gear (not shown), which is affixed (e.g., bolted) to a differential case 12. Differential case 12 is rotatably mounted in a differential housing 14 by means of bearings 15. Differential case 12 and the ring gear affixed thereto rotate about a transverse horizontal axis 'x—x', which is the axis of output shafts 24, 25.

The differential assembly in general is driven by a longitudinally extending pinion shaft (or input shaft) not shown, which in turn may be driven by a drive shaft (not shown) which extends longitudinally from a vehicle transmission. The pinion shaft may engage a ring gear (not shown), which is affixed (e.g., bolted) to a differential case 12. Differential case 12 is rotatably mounted in a differential housing 14 by means of bearings 15. Differential case 12 and the ring gear affixed thereto rotate about a transverse horizontal axis, which is the axis of output shafts 24, 25.

The outboard ends of the output shafts 24, 25 are provided with universal joints 50, 60 (e.g. constant velocity joints) between the output shafts 24, 25 and the respective wheel ends.

Figure 2:
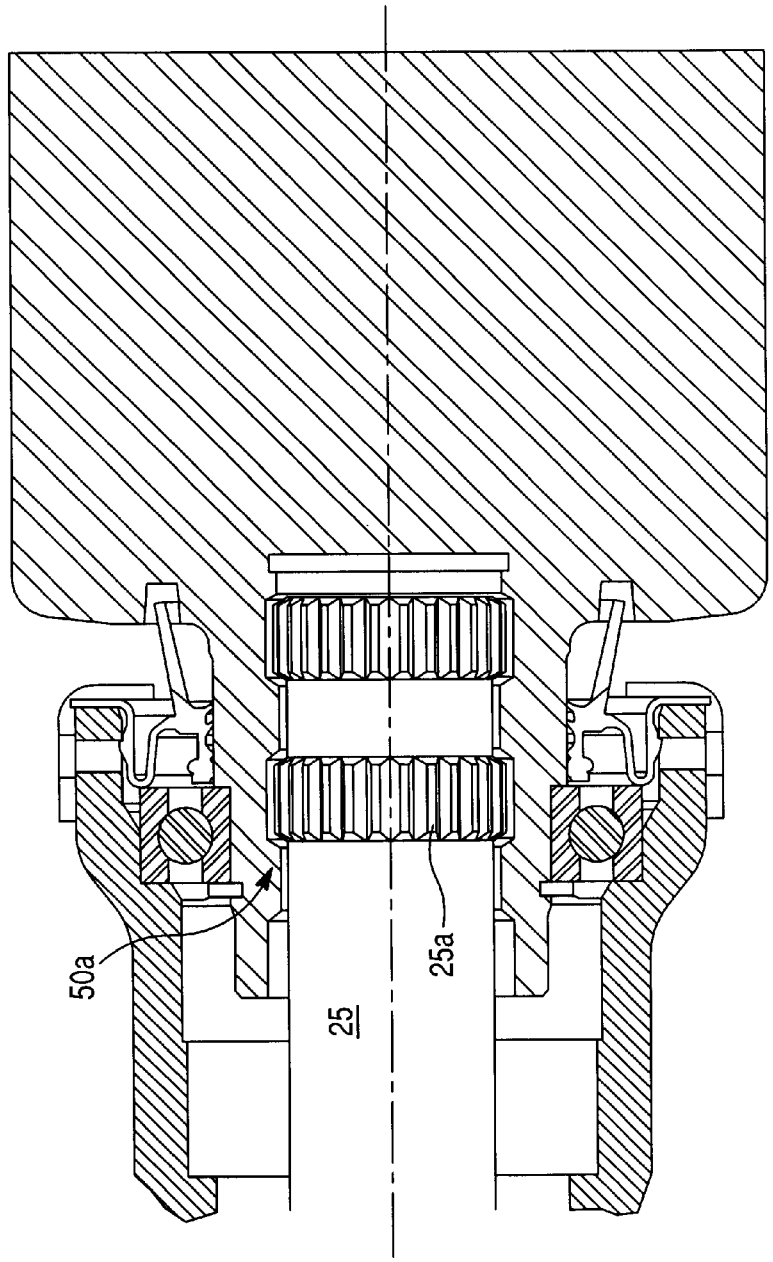
FIG. 2 is an enlarged sectional plan view of the invention according to a preferred embodiment of FIG. 1.
Figure 4:
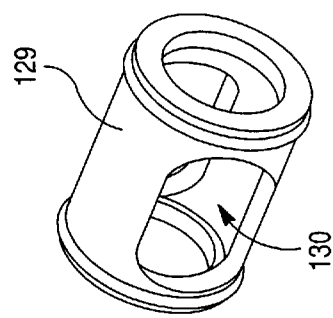
FIG. 4 is a perspective view of the interconnecting collar connecting the two output shafts of the second embodiment.

In accordance with the present invention, a clutch mechanism is provided between the universal joints 50, 60 having respective output shafts 25, 24 in the form of splines (for example, splines 25a, 50a), as best seen in FIG. 2. These splines are formed on central bores of respective inner members at the inboard side of each universal joint 50, 60.

As with the conventional differential drive assembly, the dual disconnect axle assembly of this invention includes a coaxial first (or left-hand) output shaft 24 and a second (or right-hand) output shaft 25. These output shafts 24, 25 extend transversely and are coaxial with side gears 20, 21. These output shafts 24, 25 extend from inboard ends near cross pin 16 to outboard ends, which extend outside the differential housing. Splines (e.g. splines 25a, 50a) are provided at the inboard ends of universal joints 50, 60 for selectively driving the same and which may be conventional (e.g., universal joints) provided at respective outboard ends of output shafts 24, 25 and extend transversely outwardly to wheels (not shown) at the sides of the vehicle.

Figure 3:
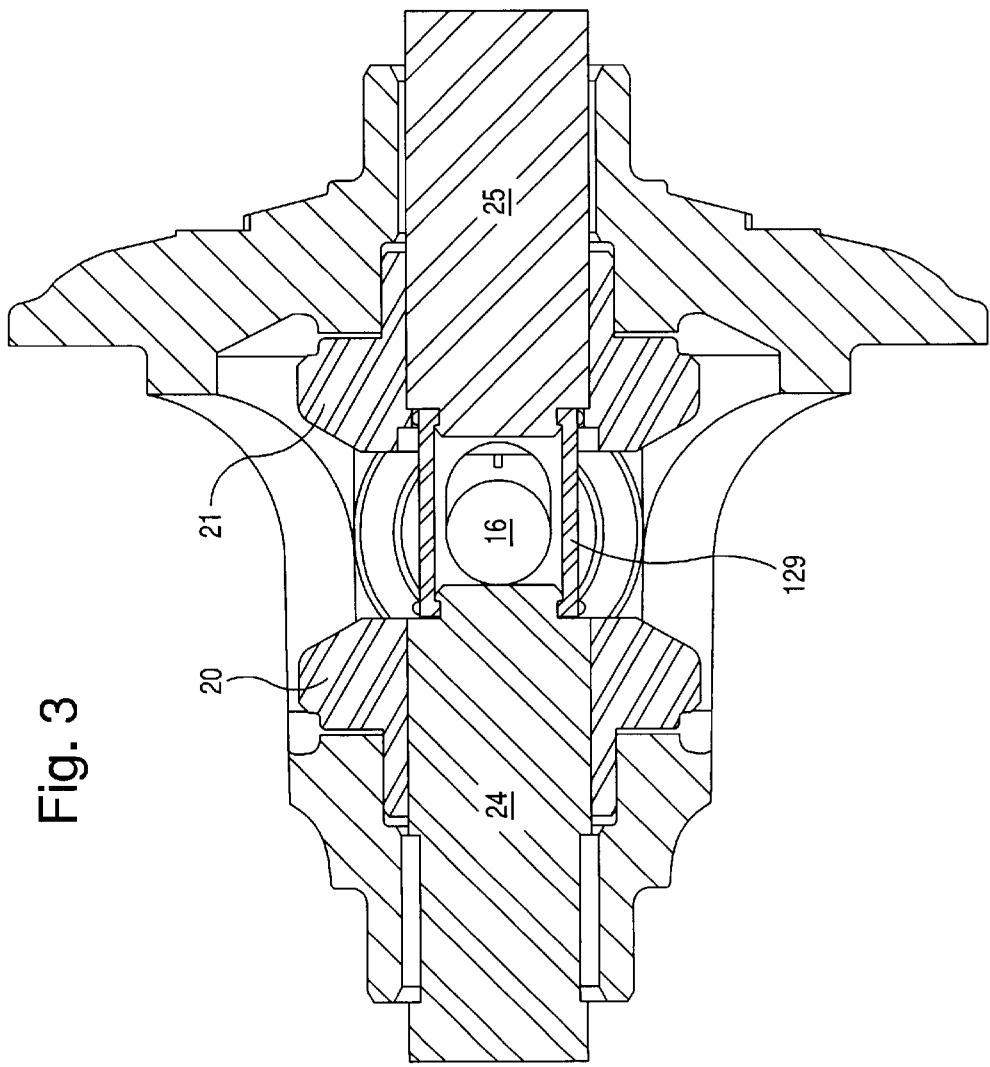
FIG. 3 is a partial sectional plan view according to the invention according to a second embodiment of the invention. In this embodiment, the return spring 42 is not required.

According to one important aspect of this invention, the first and second output shafts 24, 25 are interconnected and axially slidable together as a unit. In other words, the present invention preferably provides a linking member 29 in the form of a linking rod or other suitable member that extends through the differential assembly to connect the two output shafts 24, 25. With this arrangement, the invention provides simultaneous axial movement of the output shafts to thereby mutually disconnect the first and second output shafts 24, 25 from the first and second universal joints 50, 60. In the embodiment of FIG. 1, the linking rod 29 passes through the cross pin 16. In the alternate embodiment of FIG. 3, the linking member 129 takes the form of a connecting sleeve that connects the output shafts 24, 25. In the arrangement of FIG. 3, the cross pin 16 passes through the connecting sleeve 129 at apertures 130. In both illustrated designs, the two driven output shafts 24, 25 are securely linked together to provide mutual linear sliding movement between the clutch engaged and disengaged positions.

The dual disconnect axle assembly 14 of this invention includes a clutch mechanism for simultaneously placing output shafts 24, 25 either into or out of driving engagement with respective universal joints 50, 60. The splines between respective output shafts and the universal joints form part of this clutch assembly or mechanism.

The entire set of clutch members, including internally-splined inner member 50 of the universal joints and externally-splined output shafts 24, 25, are shown in clutch disengaging position in FIG. 1, being the normal position. Upon actuation, as will be described subsequently, the axially slidable output shafts 24, 25 slide to the left as seen in FIG. 1 into a clutch engaging position, in which clutch members or splines on respective universal joints 50, 60 are in engagement with respective splines on respective output shafts 24, 25. Output shafts 24, 25 rotate with respective universal joints 50, 60 when the clutch mechanism is in the clutch engaging position, and rotate independently of the respective universal joints 50, 60 when the clutch mechanism is in the clutch disengaging position.

A compression spring 42 serves as biasing means to urge the axially slidable output shafts 24, 25 to clutch disengaging position, i.e., to the right as seen in FIG. 1. Spring 42 abuts the first or left-hand output shaft 24.

To actuate the clutch mechanism, a clutch actuator 40 may be provided as a shift fork having a bifurcated end portion which is received in groove 38 of clutch collar 36 fixedly provided on one of the output shafts. The shift fork 40 may be actuated by known means 41, e.g., by electrical (which is preferred) or by hydraulic, pneumatic, vacuum, or mechanical means. Actuation may be initiated either automatically or by a manual operator, such as a manual or pedal control in the vehicle cab.

The output shafts 24, 25 and collar 36 are normally in clutch disengaging position, i.e., to the right as seen in FIG. 1. The vehicle is in two-wheel drive (2WD) mode when the clutch is disengaged. To engage the clutch mechanism and place the vehicle in four-wheel drive (4WD) mode, clutch actuator 40 moves clutch collar 36 to the left as seen in FIG. 1 against the bias of compression spring 42. Clutch collar 36 pushes the output shafts 24, 25 to the left against the bias of spring 42, thereby placing the clutch members or splines on respective driven output shafts 24, 25 in engagement with respective clutch members or splines (e.g., splines 52a) on respective universal joints 50, 60. With the clutch mechanism thus engaged, the output shafts 24, 25 are constrained to rotate at the same speeds as respective universal joints 50, 60 and power is transmitted to the respective wheel ends (not shown) through the joints 50, 60. When the need for four-wheel drive no longer exists, clutch actuator 40 is moved to the right. This also slides clutch collar 36 to the right. Compression spring 42 then pushes output shafts 24, 25 to the right, i.e., to the clutch disengaging position, to return the vehicle to two-wheel drive mode.

The drawings herein show a differential assembly for a front axle of a vehicle. Most current vehicles which have four-wheel drive have a full-time rear axle and a part-time front axle. However, some recent four-wheel drive vehicles have a full-time front axle and a part-time rear axle. The differential assembly of this invention can be used on either the front axle or the rear axle, whichever axle is the part-time axle.

The compression spring 42 (or other biasing means) is normally biased toward the clutch disengaging position, which results in disengagement of the part-time axle, since it is normally preferred to operate in two-wheel drive mode with the part-time axle disengaged except when driving conditions call for four-wheel drive operation. However, this spring can be biased toward clutch engaging position if desired. Other biasing means, as for example, an air spring, can be used in place of the compression spring shown if desired.

Further, the biasing means can be dispensed with entirely provided that some means, such as magnets on the relatively slidable members. Such magnets, if used, must not be so strong as to prevent or impede relative rotation between adjacent axially slidable members. Other mechanical mechanisms which function to shift the output shafts 24, 25 to the clutch disengaging position are also contemplated herein, and the second embodiment shown in FIG. 3.

It is also possible to use a spider (which typically includes a ring at its center with a plurality of radially extending arms extending outwardly from the ring) in place of the cross pin 16 if desired.

It is also possible to use a spider (which typically including a ring at its center with a plurality of radially extending arms extending outwardly from the ring) in place of the cross pin 16 if desired.

Figure 5:
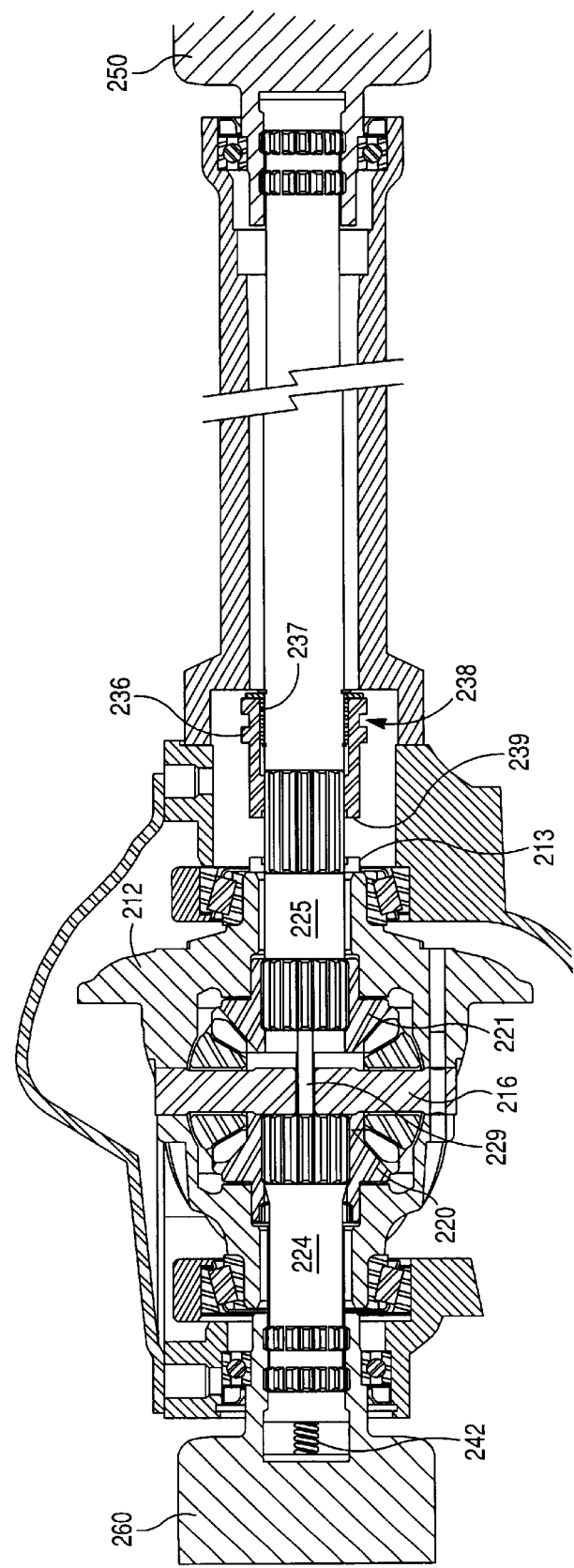
FIG. 5 is a sectional plan view of the invention according to a second preferred embodiment of the invention.

An alternate embodiment of the present invention is illustrated in FIG. 5, in which a clutch mechanism is provided between the universal joints 250, 260 and respective output shafts 225, 224 in the form of splines (for example, splines 25a, 50a in FIG. 2). These splines are formed on central bores of respective inner members at the inboard side of each universal joint 250, 260.

As with the conventional differential drive assembly, the dual disconnect axle assembly of this invention includes a coaxial first (or left-hand) output shaft 224 and a second (or right-hand) output shaft 225. These output shafts 224, 225 extend transversely and are coaxial with side gears 220, 221. These output shafts 224, 225 extend from inboard ends near cross pin 216 to outboard ends, which extend outside the differential housing. Splines (e.g. splines 25a, 50a in FIG. 2) are provided at the inboard ends of universal joints 250, 260 for selectively driving the same and which may be conventional (e.g., universal joints) provided at respective outboard ends of output shafts 224, 225 and extend transversely outwardly to wheels (not shown) at the sides of the vehicle.

According to one important aspect of this invention, the first and second output shafts 224, 225 are interconnected and axially slidable together as a unit. In other words, the present invention preferably provides a linking member 229 in the form of a linking rod or other suitable member that extends through the differential assembly to connect the two output shafts 224, 225. With this arrangement, the invention provides simultaneous axial movement of the output shafts to thereby mutually disconnect the first and second output shafts 224, 225 from the first and second universal joints 250, 260. In the embodiment of FIG. 5, the linking rod 229 passes through the cross pin 216. In the alternate embodiment of FIG. 3, the linking member takes the form of a connecting sleeve that connects the output shafts 24, 25. In the arrangement of FIG. 3, the cross pin passes through the connecting sleeve at apertures 130. In the illustrated designs, the two driven output shafts 224, 225 are securely linked together to provide mutual linear sliding movement between the clutch engaged and disengaged positions.

The dual disconnect axle assembly of this invention includes a clutch mechanism for simultaneously placing output shafts 224, 225 either into or out of driving engagement with respective universal joints 250, 260. The splines between respective output shafts and the universal joints form part of this clutch assembly or mechanism.

The entire set of clutch members, including internally-splined inner member 250 of the universal joints and externally-splined output shafts 224, 225, are shown in clutch disengaging position in FIG. 5, being the normal (default) position. Upon actuation, as will be described subsequently, the axially slidable output shafts 224, 225 slide to the left as seen in FIG. 5 into a clutch engaging position, in which clutch members or splines on respective universal joints 250, 260 are in engagement with respective splines on respective output shafts 224, 225. Output shafts 224, 225 rotate with respective universal joints 250, 260 when the clutch mechanism is in the clutch engaging position, and rotate independently of the respective universal joints 250, 260 when the clutch mechanism is in the clutch disengaging position.

A compression spring 242 serves as biasing means to urge the axially slidable output shafts 224, 225 to clutch disengaging position, i.e., to the right as seen in FIG. 5. Spring 242 abuts the first or left-hand output shaft 224.

To actuate the clutch mechanism, a clutch actuator (not shown) may be provided as a shift fork having a bifurcated end portion which is received in groove 238 of clutch collar 236 fixedly provides on one of the output shafts. The shift fork may be actuated by known means, e.g., by electrical (which is preferred) or by hydraulic, pneumatic, vacuum, or mechanical means. Actuation may be initiated either automatically or by a manual operator, such as a manual or pedal control in the vehicle cab.

In accordance with the alternate embodiment of FIG. 5, the dual disconnect axle assembly is further provided with means to enable a locking differential. To wit, the clutch collar 236 is provided with first locking teeth 239 at its left-most end facing the differential case 212 and the differential case is likewise provided with second locking teeth 213 at the trunnion facing the clutch collar 236 to thereby provide a type of dog clutch between the collar 239 and the case 213. When the clutch collar is shifted to its extreme left-most position shown in FIG. 5, the first locking teeth 239 engage the second locking teeth 213 provided on the differential case to thereby lock the output shafts 224, 225 to the differential case 212.

With the embodiment of FIG. 5, the clutch collar 236 may be shifted to a first position where the splines of output shafts mate with the splines of the universal joints by means of the compression spring 237 located inside the collar 236, and the collar 236 may be further shifted to a position where the teeth 239 engage the teeth 213 of the differential case to rotationally lock the output shafts to the differential case (i.e., locking differential).

The present invention provides a simple and reliable mechanism for simultaneous differential connect and simultaneous differential disconnect. In other words, both output shafts 24, 25 are simultaneously connected or disconnected from their respective universal joints 50, 60 in the apparatus of this invention. The novel dual disconnect differential assembly herein avoids the known disadvantages of single shaft disconnect mechanism, such as back drive, as has been discussed earlier.

The dual disconnect differential assembly of this invention is also compact. This makes part-time, dual disconnect four-wheel drive for compact and sub-compact vehicles possible.

Further, the assembly may be modified to provide a locking differential to selectively lock the output shafts to the differential case.

While this invention has been described in detail with reference to the preferred embodiments thereof, it shall be understood that various modifications (including those specifically discussed above and others) can be made without departing from the scope and spirit of this invention.

What is claimed is:

1. A dual disconnect drive axle assembly for an automotive vehicle, said assembly comprises:

first and second coaxially aligned output shafts driven by first and second side gears of a differential assembly;

first and second universal joints adapted to respectively transmit torque from said first and second output shafts;

wherein said first and second output shafts are axially slidable to thereby disconnect said first and second output shafts from said first and second universal joints.

2. The dual disconnect drive axle assembly according to claim 1, further comprising an interconnecting member interconnecting said first and second output shafts to translate simultaneously along a transverse axis, wherein said first and second output shafts are axially slidable and interconnected to provide simultaneous axial movement of said output shafts.

3. The dual disconnect drive axle assembly according to claim 2, wherein said interconnecting member comprises a rod extending from an inboard end of said first output shaft to an inboard end of said second output shaft.

4. The dual disconnect drive axle assembly according to claim 3, wherein said rod passes through a cross pin mounting pinion gears within a differential assembly.

5. The dual disconnect drive axle assembly according to claim 2, wherein said interconnecting member comprises an interconnecting collar adapted to receive a cross pin passing therethrough, said interconnecting collar extending between and connecting said first and second output shafts.

6. The dual disconnect drive axle assembly according to claim 1, further comprising:
   first clutch members on said first and second universal joints; and
   second clutch members on said first and second output shafts for engaging said first clutch members of respective first and second universal joints.

7. The dual disconnect drive axle assembly according to claim 1, further including a ring which is mounted on one of said first and second output shafts for axially moving said first and second output shafts simultaneously in the same direction between a clutch engaging position and a clutch disengaging position.

8. The dual disconnect drive axle assembly according to claim 7, further including an actuator, wherein said actuator includes an arm for engaging said ring for slidably moving said first and second output shafts between said clutch engaging position and said clutch disengaging position.

9. The dual disconnect drive axle assembly according to claim 1, wherein outer surfaces of said first and second output shafts and inner surfaces of said first and second universal joints have complementary splines.

10. The dual disconnect drive axle assembly according to claim 6, wherein an inner member of said first and second universal joints have axially extending central bores, said first clutch members on said first and second universal joints are splines formed on respective portions of said bores, said second clutch members on said first and second output shafts are splines formed on outer surfaces thereof, the splines on said first and second universal joints and the splines on said first and second output shafts being in engagement when said first and second output shafts are in a clutch engaging position and out of engagement when said first and second output shafts are in a clutch disengaging position.

11. The dual disconnect drive axle assembly according to claim 10, wherein a compression spring urges said first and second output shafts toward one of said clutch engaging position and said clutch disengaging position.

12. The dual disconnect drive axle assembly according to claim 11, wherein said compression spring urges said first and second output shafts toward said clutch disengaging position.

13. The dual disconnect drive axle assembly according to claim 1, wherein said first and second output shafts are in driving engagement with an inboard side of said first and second universal joints when said first and second output shafts are in a clutch engaging position and are in a free-wheeling mode when said first and second output shafts are in a clutch disengaging position.

14. The dual disconnect drive axle assembly according to claim 13, wherein said first and second output shafts and said first and second universal joints are capable of rotation at different speeds in both driven mode and free-wheeling mode of said first and second output shafts.

15. The dual disconnect drive axle assembly according to claim 1, further comprising a splined interconnection between the output shafts and the universal joints whereby splines of the splined interconnection are divided into a pair of axial-spaced rows of gear teeth on each of said first and second output shafts and said first and second universal joints.

16. A method of changing between two-wheel drive to four wheel drive modes for a four-wheel drive (4WD) vehicle, comprising the steps of:
   providing a clutch mechanism between first and second output shafts extending from opposite ends of a differential assembly and first and second universal joints respectively driven by said first and second output shafts
   sliding said first and second output shafts along an axial direction to disconnect said output shafts from said first and second universal joints.

17. The method of claim 16, further comprising the step of providing a splined interconnection between the output shafts and the universal joints whereby the splines are divided into a pair of axial-spaced rows of gear teeth.

18. The method of claim 16, wherein said output shafts are interconnected to simultaneously translate during said step of sliding.

19. The method of claim 16, further comprising the step of locking the output shafts to rotate with a differential case of the differential assembly.

20. The dual disconnect drive axle assembly according to claim 1, further comprising a locking clutch device for locking said output shafts to a differential case of said differential assembly.

* * * * *